(12) United States Patent
Emoto

(10) Patent No.: US 12,362,552 B2
(45) Date of Patent: Jul. 15, 2025

(54) HEAT-SHRINKABLE TUBE, HEAT-SHRINKABLE SHEET, CONNECTOR, AND METHOD FOR MANUFACTURING HEAT-SHRINKABLE TUBE

(71) Applicant: SUMITOMO ELECTRIC FINE POLYMER, INC., Osaka (JP)

(72) Inventor: Yasutaka Emoto, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 822 days.

(21) Appl. No.: 17/257,880

(22) PCT Filed: Jul. 2, 2019

(86) PCT No.: PCT/JP2019/026337
§ 371 (c)(1),
(2) Date: Jan. 5, 2021

(87) PCT Pub. No.: WO2020/026682
PCT Pub. Date: Feb. 6, 2020

(65) Prior Publication Data
US 2021/0273438 A1 Sep. 2, 2021

(30) Foreign Application Priority Data
Aug. 2, 2018 (JP) .................. 2018-145630

(51) Int. Cl.
*H02G 15/18* (2006.01)
*B29C 48/09* (2019.01)
(Continued)

(52) U.S. Cl.
CPC ......... *H02G 15/1813* (2013.01); *B29C 48/09* (2019.02); *B29C 48/12* (2019.02);
(Continued)

(58) Field of Classification Search
None
See application file for complete search history.

(56) References Cited

U.S. PATENT DOCUMENTS 3,663,739 A * 5/1972 Chevrier .................. H01B 7/08
174/32
3,775,552 A * 11/1973 Schumacher ........ H01B 7/0838
174/105 R
(Continued)

FOREIGN PATENT DOCUMENTS

FR 3026813 A1 * 4/2016 ......... F02M 37/0017
JP 1986-4366 U 1/1986
(Continued)

OTHER PUBLICATIONS

International Search Report for corresponding Application No. PCT/JP2019/026337, mailed Sep. 17, 2019.

*Primary Examiner* — Krystal Robinson
(74) *Attorney, Agent, or Firm* — Renner, Otto, Boisselle & Sklar, LLP

(57) ABSTRACT

A heat-shrinkable tube according to an aspect of the present disclosure includes a base layer that is tubular and that covers outer peripheries of a plurality of electric wires, and a plurality of ridges that are formed on an inner peripheral surface of the base layer and that extend in an axial direction of the base layer.

4 Claims, 10 Drawing Sheets

(51) Int. Cl.
  *B29C 48/12* (2019.01)
  *B29C 55/24* (2006.01)
  *B29C 71/02* (2006.01)
  *F16L 11/12* (2006.01)
  *H01R 4/72* (2006.01)

(52) U.S. Cl.
  CPC .............. *B29C 55/24* (2013.01); *B29C 71/02* (2013.01); *F16L 11/12* (2013.01); *H01R 4/72* (2013.01)

(56) References Cited

U.S. PATENT DOCUMENTS

| | | | | |
|---|---|---|---|---|
| 3,924,603 | A * | 12/1975 | Chapin | F24V 30/00 174/DIG. 8 |
| 3,984,653 | A * | 10/1976 | Blaas | B23K 9/1081 219/136 |
| 4,002,392 | A * | 1/1977 | Hardesty | H01R 24/62 439/418 |
| 4,016,356 | A * | 4/1977 | McLoughlin | H02G 15/188 174/DIG. 8 |
| 4,118,260 | A * | 10/1978 | Boettcher | B29C 61/10 156/215 |
| 4,751,614 | A * | 6/1988 | Mehnert | H01B 7/08 361/437 |
| 4,777,325 | A * | 10/1988 | Siwinski | H01B 7/0876 174/113 AS |
| 4,868,967 | A * | 9/1989 | Holt | F16L 47/20 174/135 |
| 5,048,572 | A * | 9/1991 | Levine | F16L 9/21 174/DIG. 8 |
| 5,140,746 | A * | 8/1992 | Debbaut | H02G 15/003 174/76 |
| 11,610,699 | B2 * | 3/2023 | Hirano | A61B 1/00114 |
| 2007/0137876 | A1 * | 6/2007 | Miettinen | H05K 5/069 174/50.56 |
| 2011/0030832 | A1 * | 2/2011 | Larson | F16L 3/04 138/137 |
| 2018/0062364 | A1 | 3/2018 | Qui et al. | |

FOREIGN PATENT DOCUMENTS

| | | | | |
|---|---|---|---|---|
| JP | 61-85007 | A | | 4/1986 |
| JP | 1995-36532 | U | | 7/1995 |
| JP | 8-216253 | A | | 8/1996 |
| JP | 2000102137 | A | * | 4/2000 ........... G02B 6/4403 |
| JP | 2011030323 | A | * | 2/2011 |
| JP | 2012-131132 | A | | 7/2012 |
| JP | 2016-210078 | A | | 12/2016 |
| JP | 2017-85695 | A | | 5/2017 |

* cited by examiner

HEAT-SHRINKABLE TUBE, HEAT-SHRINKABLE SHEET, CONNECTOR, AND METHOD FOR MANUFACTURING HEAT-SHRINKABLE TUBE

TECHNICAL FIELD

The present disclosure relates to a heat-shrinkable tube, a heat-shrinkable sheet, a connector, and a method for manufacturing a heat-shrinkable tube.

BACKGROUND ART

A heat-shrinkable tube is used to bundle a plurality of electric wires. The heat-shrinkable tube bundles a plurality of electric wires, which are objects to be covered, by shrinking radially so as to come into contact with outer peripheral surfaces of the electric wires.

An example of a heat-shrinkable tube for bundling a plurality of electric wires has a slit extending between the ends of the tube in an axial direction so that the electric wires can be easily inserted into a space inside the tube (Japanese Unexamined Patent Application Publication No. 2012-131132).

CITATION LIST

Patent Literature

PTL 1: Japanese Unexamined Patent Application Publication No. 2012-131132

SUMMARY OF INVENTION

A heat-shrinkable tube according to an aspect of the present disclosure includes a base layer that is tubular and that covers outer peripheries of a plurality of electric wires, and a plurality of ridges that are formed on an inner peripheral surface of the base layer and that extend in an axial direction of the base layer.

A heat-shrinkable sheet according to another aspect of the present disclosure includes a base layer that is rectangular and that covers outer peripheries of a plurality of electric wires, and a pair of ridges that extend along both edges of the base layer.

A connector according to another aspect of the present disclosure includes a plurality of electric wires, each electric wire including a conductor and an insulating layer provided on an outer peripheral surface of the conductor, and a tube that covers the plurality of electric wires. The tube includes a base layer that is tubular and that covers outer peripheries of the plurality of electric wires, and a plurality of ridges that are formed on an inner peripheral surface of the base layer and that extend in an axial direction of the base layer.

A connector according to another aspect of the present disclosure includes a plurality of electric wires, each electric wire including a conductor and an insulating layer provided on an outer peripheral surface of the conductor; a sheet that covers the plurality of electric wires; and an attachment substrate having a pair of slits that are linear and parallel to each other, the attachment substrate being connected to the sheet with the plurality of electric wires disposed between the attachment substrate and the sheet. The sheet includes a base layer that is rectangular and that covers outer peripheries of the plurality of electric wires, and a pair of ridges that extend along both edges of the base layer. The pair of ridges are engaged with the pair of slits.

A method for manufacturing a heat-shrinkable tube according to another aspect of the present disclosure includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. In the extruding step, a plurality of ridges that extend in an axial direction are formed on an inner peripheral surface of the tubular body.

DESCRIPTION OF EMBODIMENTS

Figure 1:
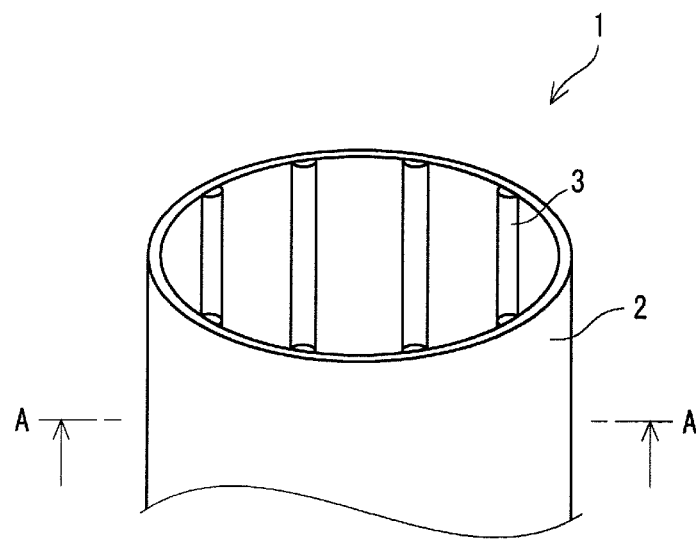
FIG. 1 is a schematic perspective view of a heat-shrinkable tube according to an embodiment.

Problems to be Solved by Present Disclosure

The heat-shrinkable tube according to the related art described in the above-mentioned publication bundles a plurality of electric wires together in a cylindrical shape. In recent years, attempts have been made to increase the capacities of interior spaces of, for example, transportation devices, such as vehicles and airplanes, and electrical appliances. Accordingly, electric wires installed in the interior spaces are desirably arranged in a space-saving manner.

However, when the heat-shrinkable tube according to the related art described in the above-mentioned publication is installed, the heat-shrinkable tube occupies a space with a large height in the interior space, which makes it difficult to increase an effective space.

The present disclosure has been made based on the above-described circumstances, and an object of the present disclosure is to provide a heat-shrinkable tube with which a plurality of electric wires can be bundled in parallel and installed in a space-saving manner.

Advantageous Effects of Present Disclosure

According to the present disclosure, a heat-shrinkable tube with which a plurality of electric wires can be bundled in parallel and installed in a space-saving manner can be provided.

DESCRIPTION OF EMBODIMENTS OF PRESENT DISCLOSURE

Aspects of the present disclosure will now be described.

A heat-shrinkable tube according to an aspect of the present disclosure includes a base layer that is tubular and that covers outer peripheries of a plurality of electric wires, and a plurality of ridges that are formed on an inner peripheral surface of the base layer and that extend in an axial direction of the base layer.

According to the heat-shrinkable tube, the electric wires are guided by the ridges formed on the inner peripheral surface of the base layer that covers the outer peripheries of the electric wires, and are easily arranged in parallel on the inner side of the base layer. Thus, the electric wires can be installed in a space-saving manner. Also, the space inside the inner peripheral surface of the base layer can be sectioned by increasing the intervals between the ridges and using the ridges as partitions.

The base layer preferably has a flat tubular shape after being heat-shrunk. When the base layer has a flat tubular shape after being heat-shrunk, the electric wires can be easily bundled in parallel in a flat direction of the base layer. Here, the term "flat direction" means the direction of the major axis of an elongated circle.

Preferably, the heat-shrinkable tube further includes an adhesive layer provided on an outer peripheral surface of the base layer. When the heat-shrinkable tube further includes the adhesive layer provided on the outer peripheral surface of the base layer, the electric wires bundled in parallel by the tube that is heat-shrunk can be easily fixed to an installation surface of, for example, a transportation device, such as a vehicle, or an electrical appliance.

The heat-shrinkable tube preferably further includes an adhesive layer provided on the inner peripheral surface of the base layer. When the heat-shrinkable tube further includes the adhesive layer provided on the inner peripheral surface of the base layer, the electric wires can be easily fixed to the inner peripheral surface of the base layer.

Preferably, the base layer includes a pair of thick portions that extend in the axial direction, and the pair of thick portions are positioned to face each other. In the case where the base layer includes the pair of thick portions that extend in the axial direction and the pair of thick portions are positioned to face each other, when the heat-shrinkable tube shrinks, the electric wires are guided by the pair of thick portions and easily arranged in parallel on the inner side of the base layer. Thus, the electric wires can be more easily bundled in parallel.

A heat-shrinkable sheet according to another aspect of the present disclosure includes a base layer that is rectangular and that covers outer peripheries of a plurality of electric wires, and a pair of ridges that extend along both edges of the base layer.

According to the heat-shrinkable sheet, the electric wires can be bundled in parallel and arranged in a space-saving manner after the heat-shrinkable sheet is heat-shrunk. In addition, the electric wires can be easily fixed to an installation surface of, for example, a transportation device, such as a vehicle, or an electrical appliance due to the pair of ridges that extend along both edges of the base layer.

A connector according to another aspect of the present disclosure includes a plurality of electric wires, each electric wire including a conductor and an insulating layer provided on an outer peripheral surface of the conductor, and a tube that covers the plurality of electric wires. The tube includes a base layer that is tubular and that covers outer peripheries of the plurality of electric wires, and a plurality of ridges that are formed on an inner peripheral surface of the base layer and that extend in an axial direction of the base layer.

The connector is configured such that the tube that covers the electric wires includes the ridges on the inner peripheral surface of the base layer that is tubular and that covers the outer peripheries of the electric wires. The ridges extend in the axial direction of the base layer. Accordingly, the electric wires can be aligned in parallel and arranged in a small space. Therefore, when the electric wires are to be installed in an interior space of, for example, a transportation device, such as a vehicle, or an electrical appliance, the electric wires can be arranged in a small region in a space-saving manner.

Preferably, the connector further includes an attachment substrate connected to an outer peripheral surface of the tube, the attachment substrate has a slit that is linear, and the plurality of ridges include a ridge that is engaged with the slit. In the case where the attachment substrate connected to the outer peripheral surface of the tube is additionally provided, the attachment substrate has a slit that is linear, and the plurality of ridges include a ridge that is engaged with the slit, the electric wires can be arranged in parallel on the attachment substrate.

A connector according to another aspect of the present disclosure includes a plurality of electric wires, each electric wire including a conductor and an insulating layer provided on an outer peripheral surface of the conductor; a sheet that covers the plurality of electric wires; and an attachment substrate having a pair of slits that are linear and parallel to each other, the attachment substrate being connected to the sheet with the plurality of electric wires disposed between the attachment substrate and the sheet. The sheet includes a base layer that is rectangular and that covers outer peripheries of the plurality of electric wires, and a pair of ridges that extend along both edges of the base layer. The pair of ridges are engaged with the pair of slits.

According to this connector, the sheet is connected to the attachment substrate by the pair of ridges, which extend along both edges of the base layer, with the electric wires disposed between the sheet and the attachment substrate. Thus, the electric wires are stably bundled in parallel.

A method for manufacturing a heat-shrinkable tube according to another aspect of the present disclosure includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. In the extruding step, a plurality of ridges that extend in an axial direction are formed on an inner peripheral surface of the tubular body.

According to the method for manufacturing the heat-shrinkable tube, the ridges that extend in the axial direction are formed on the inner peripheral surface of the tubular body in the extruding step. Therefore, the electric wires are guided by the ridges and easily arranged in parallel on the inner side of the base layer. Thus, a heat-shrinkable tube with which the electric wires can be installed in a space-saving manner can be manufactured.

Details of Embodiments of Present Disclosure

Preferred embodiments of the present disclosure will now be described with reference to the drawings.

First Embodiment

<Heat-Shrinkable Tube>

Figure 2:
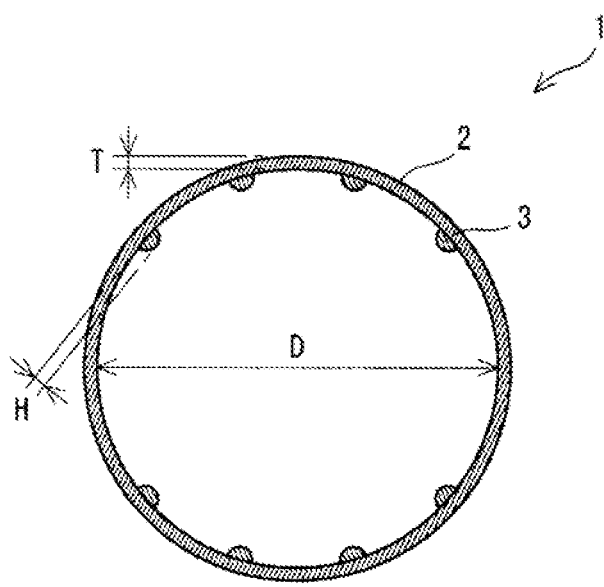
FIG. 2 is a sectional view of the heat-shrinkable tube illustrated in FIG. 1 taken along line A-A.

A heat-shrinkable tube 1 illustrated in FIGS. 1 and 2 includes a tubular base layer 2 that covers outer peripheries of a plurality of electric wires and a plurality of ridges 3 that are formed on an inner peripheral surface of the base layer 2 and that extend in an axial direction of the base layer 2.

The heat-shrinkable tube 1 includes the base layer 2 and the ridges 3, and does not include any layer other than the base layer 2 and the ridges 3. The heat-shrinkable tube 1 is obtained by extruding a resin composition used to form the base layer 2 and the ridges 3 in a tubular shape, temporarily fixing the extruded tubular body by irradiation with active energy rays, such as electronic rays, and cylindrically expanding the tubular body to increase the diameter of the tubular body. When heated, the heat-shrinkable tube 1 shrinks to return to the shape fixed by the active energy rays.

The heat-shrinkable tube 1 is suitable for bundling a plurality of electric wires together. A lower limit of an average inner diameter D of the heat-shrinkable tube 1 may be set in accordance with the size, number, etc. of the electric wires to be bundled. For example, the lower limit is preferably 1.4 mm, and more preferably 2.3 mm. An upper limit of the average inner diameter D of the heat-shrinkable tube 1 is preferably 50 mm, and more preferably 30 mm. When the average inner diameter D is below the lower limit, there is a risk that the electric wires cannot be easily inserted. When the average inner diameter D is above the upper limit, there is a risk that the heat-shrinkable tube 1 will be unnecessarily large. The term "average inner diameter of heat-shrinkable tube" means an average inner diameter of the base layer excluding the ridges.

(Base Layer)

The base layer 2 is composed of a resin composition whose main component is a synthetic resin. The base layer 2 is, for example, cylindrical and flexible. Inner peripheral surfaces of portions of the base layer 2 where the ridges 3 are not formed constitute an inner peripheral surface of the heat-shrinkable tube 1. The base layer 2 may be transparent to ensure good visibility of the electric wires from the outside. Examples of the synthetic resin include polyethylene, ethylene-vinyl acetate copolymers, polyesters, polyamides, polyvinyl chloride, and fluoropolymers. Among these synthetic resins, polyethylene is preferred, considering the service temperature. The synthetic resins may be used individually or as a mixture of two or more thereof. The base layer 2 may contain components other than the synthetic resins as necessary as long as the advantages of the present disclosure are not impaired. For example, a flame retardant, an antioxidant, a copper inhibitor, a lubricant, a colorant, a heat stabilizer, an ultraviolet absorber, etc. may be contained.

Examples of the flame retardant include chlorine-based flame retardants, such as chlorinated paraffin, chlorinated polyethylene, chlorinated polyphenyl, and perchloropentacyclodecane, and bromine-based flame retardants, such as 1,2-bis(2,3,4,5,6-pentabromophenyl)ethane, ethylenebispentabromobenzene, ethylenebispentabromodiphenyl, tetrabromoethane, tetrabromobisphenol A, hexabromobenzene, decabromobiphenyl ether, tetrabromophthalic anhydride, polydibromophenylene oxide, hexabromocyclodecane, and ammonium bromide. The bromine-based flame retardants and the chlorine-based flame retardants may be used individually or in combination of two or more thereof.

Examples of the antioxidant include phenolic compounds, amine-based compounds, hindered amine-based compounds, hindered phenolic compounds, salicylic acid derivatives, benzophenone-based compounds, and benzotriazole-based compounds. In particular, hindered amine-based compounds, which effectively suppress cross-linking, are preferably used. By using these antioxidants, resistance to copper-induced degradation can be enhanced. In addition to the above-mentioned antioxidants, sulfur-based compounds and phosphite-based compounds, for example, may be used individually or in combination.

Examples of the copper inhibitor include 3-(N-salicyloyl)amino-1,2,4-triazole, decamethylenedicarboxylic acid disalicyloylhydrazide, and 2,3-bis[3-(3,5-di-tert-butyl-4-hydroxyphenyl)propionyl]propionohydrazide.

The base layer 2 has a uniform thickness. A lower limit of an average thickness T of the base layer 2 is preferably 0.1 mm, and more preferably 1.0 mm. An upper limit of the average thickness T of the base layer 2 is preferably 5.0 mm, and more preferably 3.0 mm. When the average thickness T is below the lower limit, there is a risk that the base layer 2 will not be strong enough. When the average thickness T is above the upper limit, there is a risk that it will take an unnecessarily long time to heat-shrink the heat-shrinkable tube 1 and that the electric wires cannot be efficiently bundled. The term "uniform thickness" means that variation in the thickness of the base layer is 0.5 mm or less. The term "average thickness" means the average of thicknesses at any ten points.

Figure 3:
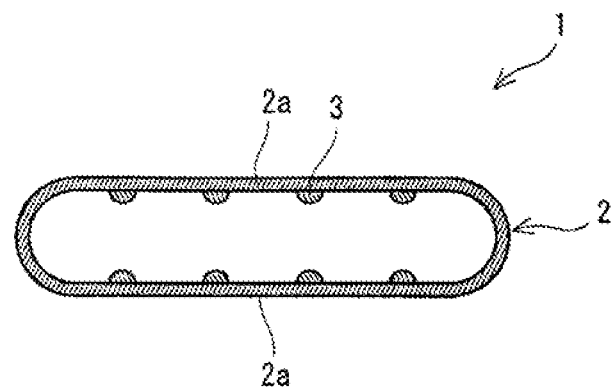
FIG. 3 is a schematic sectional view of the heat-shrinkable tube illustrated in FIG. 1 in a heat-shrunk state.

As illustrated in FIG. 3, the base layer 2 preferably has a flat tubular shape after being heat-shrunk. When the base layer has a flat tubular shape after being heat-shrunk, the electric wires can be easily bundled in parallel in the flat direction of the base layer. As described above, when the heat-shrinkable tube 1 is used, that is, when the electric wires are disposed therein, the heat-shrinkable tube 1 is heated and thereby shrinks to return to the shape fixed by the irradiation with the active energy rays, such as electronic rays. Namely, in the case where the tubular body is irradiated with the active energy rays so that the shape thereof is fixed to a flat tubular shape before the diameter thereof is increased, the heat-shrinkable tube 1 shrinks to return to the radially flat tubular shape when heated. The term "radially flat tubular shape" means a shape obtained by pressing a cylindrical body from both sides in a radial direction toward the center, and is typically an elliptical tubular shape or an oval tubular shape. FIG. 3 illustrates an oval tubular shape including a pair of flat plate portions 2a that face each other.

(Ridges)

The ridges 3 are arranged in parallel to the axial direction of the base layer 2. The ridges 3 extend between the ends of the base layer 2 in the axial direction. The ridges 3 are made of the same resin composition as that of the base layer 2, and are formed integrally with the base layer 2. According to the heat-shrinkable tube 1, the electric wires are guided by the ridges 3 and easily arranged in parallel on the inner side of the base layer. Thus, the electric wires can be installed in a space-saving manner. Also, the space inside the inner peripheral surface of the base layer can be sectioned by increasing the intervals between the ridges and using the ridges as partitions. The ridges 3 do not expand during manufacture of the heat-shrinkable tube 1 (more specifically, in a diameter-increasing step described below), and therefore the size thereof stays substantially the same after the heat-shrinkable tube 1 is heat-shrunk.

The heat-shrinkable tube 1 is preferably formed such that a plurality of pairs of ridges 3 are positioned symmetrically about an imaginary plane including a central axis of the base layer 2. In particular, as illustrated in FIG. 3, the heat-shrinkable tube 1 is preferably formed such that the ridges 3 of each pair face each other in a direction perpendicular to the flat direction when the base layer 2 is shrunk into the radially flat tubular shape. More specifically, in the present embodiment, the ridges 3 of each pair are preferably formed at positions on the pair of flat plate portions 2a that face each other. In this case, according to the heat-shrinkable tube 1, the electric wires are guided between the ridges 3 adjacent to each other in the flat direction and easily bundled in parallel.

A pitch of the ridges 3 on the same side of the imaginary plane (pitch of the ridges 3 on each flat plate portion 2a in the present embodiment) is preferably uniform so that the electric wires can be easily guided between the ridges 3. An average pitch of the ridges 3 on the same side of the imaginary plane is not particularly limited, and may be set in accordance with the object. When the ridges 3 are used as guides, the average pitch of the ridges 3 may be, for example, about 1.5 times or more and about 3.0 times or less of the diameter of the electric wires to be bundled by the heat-shrinkable tube 1. More specifically, when the ridges 3 are used as guides, the average pitch may be, for example, 1.3 mm or more and 6.0 mm or less. When the ridges 3 are used as partitions, the average pitch may be, for example, 1.3 mm or more and 6 mm or less. The term "average pitch" means the average of pitches of any 5 pairs of adjacent ridges (all pairs of adjacent ridges when the number of pairs of adjacent ridges is 5 or less). The pitch between the ridges 3 on both sides of the imaginary plane may be greater than the pitch of the ridges 3 on the same side of the imaginary plane. Here, the expression "pitch is uniform" means that variation in the pitch of the ridges is 0.5 mm or less.

The shape of the ridges 3 in cross section in a direction perpendicular to the axial direction is not particularly limited, and may be, for example, a semicircular shape or a polygonal shape.

The ridges 3 preferably have a uniform height H. The height H is not particularly limited, and may be set in accordance with the object. With regard to the average height H of the ridges 3, when the ridges 3 are used as guides, for example, a lower limit of the average height H of the ridges 3 is preferably 0.3 mm, and more preferably 0.5 mm. Also, an upper limit of the average height H is preferably 2.0 mm, and more preferably 1.0 mm. When the ridges 3 are used as partitions, for example, the lower limit of the average height H of the ridges 3 is preferably 0.6 mm, and more preferably 1.0 mm. Also, the upper limit of the average height H is preferably 4 mm, and more preferably 2 mm. The expression "height is uniform" means that variation in the height of the ridges is 0.5 mm or less. The term "average height" means the average of heights of all of the ridges on any cross section that is perpendicular to the axial direction.

<Connector>

Figure 4:
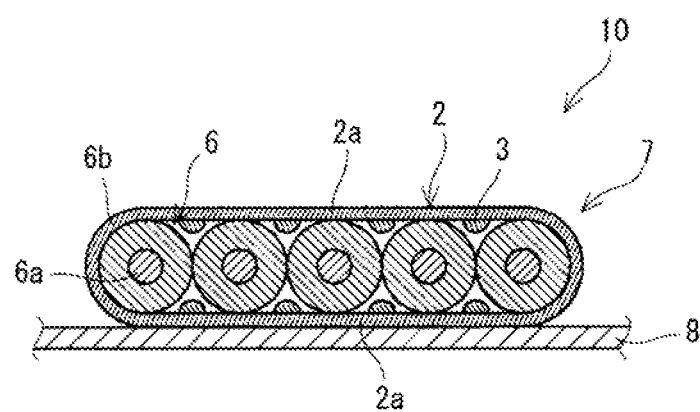
FIG. 4 is a schematic sectional view of a connector formed by using the heat-shrinkable tube illustrated in FIG. 1.

A connector 10 formed by using the heat-shrinkable tube 1 will now be described with reference to FIG. 4. The connector 10 includes a plurality of electric wires 6, each including a conductor 6a and an insulating layer 6b provided on an outer peripheral surface of the conductor 6a, and a tube 7 that covers the electric wires 6. The tube 7 is formed by heat-shrinking the heat-shrinkable tube 1. The tube 7 includes the tubular base layer 2 that covers outer peripheries of the electric wires 6 and the ridges 3 that are formed on the inner peripheral surface of the base layer 2 and that extend in the axial direction of the base layer 2.

The connector 10 is configured such that the electric wires 6 are bundled in parallel by the tube 7. The connector 10 is obtained by shrinking the heat-shrinkable tube 1 with the electric wires 6 inserted therein, so that the electric wires 6 are guided between the ridges 3 adjacent to each other and are aligned in parallel. The heat-shrinkable tube 1 shrinks into, for example, an oval tubular shape having the pair of flat plate portions 2a that face each other. Accordingly, the electric wires 6 can be arranged in one line and sandwiched between the flat plate portions 2a. Although the number of ridges 3 included in the connector 10 is not particularly limited, adjacent ones of the electric wires 6 are preferably partitioned from each other by one pair of ridges 3. Therefore, when, for example, the number of electric wires 6 is n, the number of ridges 3 may be (2n−2) or ((2n−2)+2α), where α is an integer of 0 or more.

The connector 10 is configured such that the tube 7 that covers the electric wires 6 includes the ridges 3 on the inner peripheral surface of the tubular base layer 2 that covers the outer peripheries of the electric wires 6. The ridges 3 extend in the axial direction of the base layer 2. Accordingly, the electric wires 6 can be bundled in parallel.

According to the connector 10, the electric wires 6 bundled in parallel by the tube 7, for example, can be easily arranged on a flat plate-shaped attachment substrate 8.

The material of the conductor 6a of each electric wire 6 is not particularly limited as long as the material is conductive, and may be, for example, copper, copper alloy, aluminum, nickel, silver, soft iron, steel, or stainless steel. The main component of the insulating layer 6b of each electric wire 6 may be, for example, a synthetic resin such as polyvinyl formal, polyurethane, acrylic resin, epoxy resin, phenoxy resin, polyester, polyester imide, polyester amide imide, polyamide imide, polyimide, polyether imide, polyether ether ketone, or polyether sulfone.

The size of each electric wire 6, the number of electric wires 6, etc. are not particularly limited. However, the electric wires 6 preferably have a uniform diameter so that the electric wires 6 can be easily and reliably guided between the ridges 3 when the heat-shrinkable tube 1 is heat-shrunk. In addition, the electric wires 6 preferably have a circular shape in cross section in a direction perpendicular to the axial direction. The number of electric wires 6 is not particularly limited, but is generally 2 or more and 50 or less, for example.

<Method for Manufacturing Heat-Shrinkable Tube>

A method for manufacturing the heat-shrinkable tube 1 illustrated in FIG. 1 will now be described with reference to FIG. 5. The method for manufacturing the heat-shrinkable tube includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. According to the method for manufacturing the heat-shrinkable tube, a plurality of ridges that extend in an axial direction are formed on an inner peripheral surface of the tubular body in the extruding step. The term "melting point" means a melting peak temperature measured by a differential scanning calorimeter (DSC) in accordance with JIS-K7121: 2012 "Testing Methods for Transition Temperatures of Plastics". The term "softening point" means a Vicat softening temperature measured in accordance with JIS-K7206: 2016 "Plastics—Thermoplastic Materials—Determination of Vicat Softening Temperature (VST)". When the main component of the resin composition is a crystalline resin, the heating temperature is determined based on the melting point. When the main component is a non-crystalline resin, the heating temperature is determined based on the softening point. When the resin composition is a mixture of a crystalline resin and a non-crystalline resin, the heating temperature is determined based on the softening point of the non-crystalline resin. The melting point or the softening point may be determined as, for example, a weighted average of the melting point of a synthetic resin that is the main component and the melting point of another component.

According to the method for manufacturing the heat-shrinkable tube, the ridges that extend in the axial direction are formed on the inner peripheral surface of the tubular body in the extruding step. Therefore, the electric wires are guided by the ridges and easily arranged in parallel on the inner side of the base layer. Thus, a heat-shrinkable tube with which the electric wires can be installed in a space-saving manner can be manufactured.

(Extruding Step)

In the extruding step, a resin composition used to form the base layer 2 and the ridges 3 is extruded in a tubular shape by using a known melt extruder. The resin composition is prepared by mixing the synthetic resin that is the main component of the base layer 2 and the ridges 3 with additives, which are added as necessary, by using a melt mixer, for example. In the extruding step, the resin composition is extrusion-molded by using an extrusion die having a first space that is tubular and from which a layer corresponding to the base layer 2 is extruded, and a plurality of second spaces that are rod-shaped, that are formed on an inner peripheral surface of the first space, and whose shape corresponds to the shape of the ridges 3. Accordingly, a tubular body (extruded body) having a plurality of ridges corresponding to the ridges 3 on an inner peripheral surface of the layer corresponding to the base layer 2 is obtained.

The first space preferably has a flat tubular shape. In other words, in the extruding step, the layer corresponding to the base layer 2 is preferably extruded in a flat tubular shape. The flat tubular shape is preferably an oval tubular shape having a pair of flat plate portions that face each other.

The second spaces are preferably positioned symmetrically about an imaginary plane including a central axis of the first space. In other words, a plurality of pairs of second spaces are preferably formed symmetrically about the imaginary plane. In particular, when the first space has a flat tubular shape, the second spaces are preferably positioned symmetrically about an imaginary plane that includes the central axis of the first space and that extends in the flat direction of the first space. In the present embodiment, the second spaces of each pair are preferably formed at positions on the pair of flat plate portions that face each other.

(Cross-Linking Step)

In the cross-linking step, the tubular body extruded in the extruding step is subjected to cross-linking. The cross-linking method may be, for example, irradiation with ionizing radiation, such as electronic rays, chemical cross-linking, or thermal cross-linking. In particular, cross-linking by irradiation with electronic rays provides a short cross-linking time and a high manufacturing efficiency, and is therefore preferred. The exposure dose of the ionizing radiation is not particularly limited as long as the resin composition can be sufficiently cross-linked. A lower limit of the exposure dose is, for example, preferably 30 kGy, and more preferably 100 kGy. An upper limit of the exposure dose is, for example, preferably 500 kGy, and more preferably 400 kGy. Thus, in the cross-linking step, the materials of the resin composition are cross-linked so that the shape of the tubular body is fixed to the shape at the time of extrusion. As a result, the heat-shrinkable tube manufactured by the above-described method for manufacturing the heat-shrinkable tube shrinks to return to the shape of the tubular body after the extrusion when heated.

(Heating Step)

In the heating step, the tubular body subjected to cross-linking in the cross-linking step is heated to a temperature higher than or equal to the melting point or the softening point so that the diameter thereof can be easily increased in the subsequent diameter-increasing step. In the heating step, the tubular body is heated to the temperature higher than or equal to the melting point or the softening point while being conveyed in the axial direction. In the heating step, the heating temperature may be set in accordance with the melting point or the softening point of the tubular body. A lower limit of the heating temperature is, for example, 70° C., and more preferably 80° C. An upper limit of the heating temperature is, for example, preferably 230° C., and more preferably 180° C.

(Diameter-Increasing Step)

In the diameter-increasing step, the diameter of the tubular body heated in the heating step and conveyed in the axial direction is increased. The diameter-increasing step may be performed by using, for example, a known sizing tube. In the diameter-increasing step, the pressure in the internal space of the sizing tube is reduced while gas is supplied to the space inside the tubular body through an opening at an end of the tubular body. Thus, in the diameter-increasing step, the diameter of the tubular body is increased based on the difference between the pressure in the tubular body and the pressure in the internal space of the sizing tube.

In the diameter-increasing step, the tubular body is, for example, cylindrically expanded to increase the diameter thereof. In other words, in the diameter-increasing step, the tubular body is increased in diameter so that the shape thereof changes to the shape of the heat-shrinkable tube 1 illustrated in FIG. 1.

(Cooling Step)

In the cooling step, the tubular body whose diameter has been increased in the diameter-increasing step is cooled so that the size of the tubular body is fixed to that after the increase in diameter.

The method for manufacturing the heat-shrinkable tube may further include a winding step of winding the tubular body after the cooling step. The method for manufacturing the heat-shrinkable tube may further include a cutting step of cutting the tubular body to a desired length after the cooling step or the winding step.

According to the method for manufacturing the heat-shrinkable tube, the ridges that extend in the axial direction are formed on the inner peripheral surface of the tubular body in the extruding step. Therefore, the electric wires are guided by the ridges and easily arranged in parallel on the inner side of the base layer. Thus, a heat-shrinkable tube with which the electric wires can be installed in a space-saving manner can be manufactured.

Second Embodiment

<Heat-Shrinkable Tube>

Figure 6:
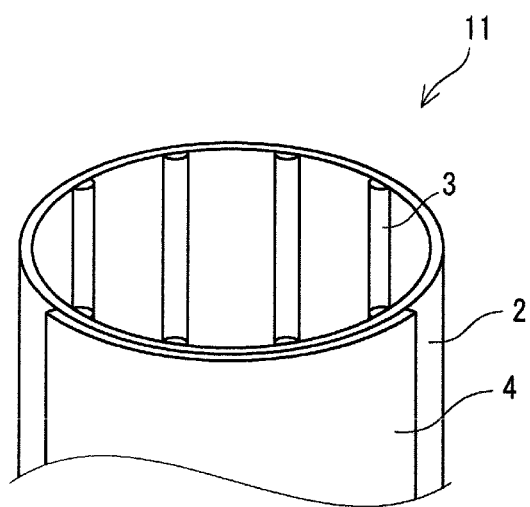
FIG. 6 is a schematic perspective view of a heat-shrinkable tube according to another embodiment that differs from the heat-shrinkable tube illustrated in FIG. 1.

A heat-shrinkable tube 11 illustrated in FIG. 6 includes a tubular base layer 2 that covers outer peripheries of a plurality of electric wires and a plurality of ridges 3 that are formed on an inner peripheral surface of the base layer 2 and that extend in an axial direction of the base layer 2. The heat-shrinkable tube 11 further includes an adhesive layer 4 provided on an outer peripheral surface of the base layer 2. Since the heat-shrinkable tube 11 additionally includes the adhesive layer 4 provided on the outer peripheral surface of the base layer 2, the electric wires bundled in parallel by the tube that is heat-shrunk can be easily fixed to an installation surface of, for example, a transportation device, such as a vehicle, or an electrical appliance.

Since the heat-shrinkable tube 11 includes the adhesive layer 4 provided on the outer peripheral surface of the base layer 2, when the base layer 2 is heat-shrunk to bundle the electric wires, the adhesive layer 4 is shrunk along with the base layer 2 on the outer peripheral surface of the base layer 2 and attached to an attachment substrate (not illustrated) that defines the installation surface. Thus, the heat-shrinkable tube 11 enables the electric wires bundled in parallel to be easily attached to the attachment substrate.

The heat-shrinkable tube 11 includes the base layer 2, the ridges 3, and the adhesive layer 4, and does not include any layer other than the base layer 2, the ridges 3, and the adhesive layer 4. The structures of the base layer 2 and the ridges 3 of the heat-shrinkable tube 11 may be similar to those of the heat-shrinkable tube 1 illustrated in FIG. 1. Thus, only the adhesive layer 4 will be described.

(Adhesive Layer)

The adhesive layer 4 is provided directly on the outer peripheral surface of the base layer 2. The adhesive layer 4 constitutes an outermost layer of the heat-shrinkable tube 11. The adhesive layer 4 is provided on the outer peripheral surface of the base layer 2 at a side at which the base layer 2 is to be attached to the attachment substrate. More specifically, the adhesive layer 4 is provided on a flat surface of the base layer 2 in a heat-shrunk state, and is provided on an outer surface of one flat plate portion 2a in the present embodiment.

The adhesive layer 4 is band-shaped and extends in the axial direction of the base layer 2. The adhesive layer 4 extends between the ends of the base layer 2 in the axial direction. The adhesive layer 4 is provided only on the flat surface of the base layer 2 in a heat-shrunk state. In other words, in the present embodiment, the adhesive layer 4 is not provided on a surface other than the outer surface of one flat plate portion 2a.

The main component of the adhesive layer 4 is a thermoplastic resin or an elastomer. Examples of the thermoplastic resin include polyolefins, polyesters, and polyamides. Examples of the elastomer include butyl rubber, acrylic rubber, and natural rubber.

<Connector>

Figure 7:
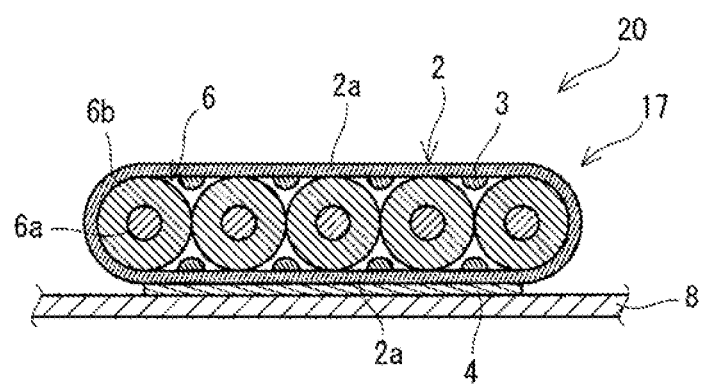
FIG. 7 is a schematic sectional view of a connector formed by using the heat-shrinkable tube illustrated in FIG. 6.

A connector 20 formed by using the heat-shrinkable tube 11 will now be described with reference to FIG. 7. The connector 20 includes a plurality of electric wires 6, each including a conductor 6a and an insulating layer 6b provided on an outer peripheral surface of the conductor 6a, a tube 17 that covers the electric wires 6, and an attachment substrate 8 connected to an outer peripheral surface of the tube 17. The tube 17 is formed by heat-shrinking the heat-shrinkable tube 11. The tube 17 includes the tubular base layer 2 that covers outer peripheries of the electric wires 6, the ridges 3 that are formed on the inner peripheral surface of the base layer 2 and that extend in the axial direction of the base layer 2, and the adhesive layer 4 provided on the outer peripheral surface of the base layer 2. The tube 17 is bonded to the attachment substrate 8 by the adhesive layer 4. The electric wires 6 are arranged in one line inside the tube 17. The electric wires 6 are similar to the electric wires 6 of the connector 10 illustrated in FIG. 4, and are thus denoted by the same reference numeral and are not described anew.

The connector 20 is obtained by heat-shrinking the base layer 2 with the electric wires 6 inserted therein, so that the electric wires 6 are bundled while the adhesive layer 4 is shrunk along with the base layer 2 on the outer peripheral surface of the base layer 2 and attached to the attachment substrate 8. The connector 20 is configured such that the electric wires 6 are stably bundled in parallel on the attachment substrate 8.

<Method for Manufacturing Heat-Shrinkable Tube>

A method for manufacturing the heat-shrinkable tube 11 illustrated in FIG. 6 will now be described. The method for manufacturing the heat-shrinkable tube includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. The method for manufacturing the heat-shrinkable tube is similar to the method for manufacturing the heat-shrinkable tube illustrated in FIG. 5 except that, in the extruding step, a layer corresponding to the adhesive layer 4 is formed on an outer peripheral surface of a layer corresponding to the base layer 2 at the time when ridges corresponding to the ridges 3 are formed on an inner peripheral surface of the layer corresponding to the base layer 2.

More specifically, in the extruding step, a resin composition used to form the base layer 2 and the ridges 3 and a resin composition used to form the adhesive layer 4 are simultaneously extrusion-molded by using an extrusion die having a first space that is tubular and from which the layer corresponding to the base layer 2 is extruded; a plurality of second spaces that are rod-shaped, that are formed on an inner peripheral surface of the first space, and whose shape corresponds to the shape of the ridges 3; and a third space that is band-shaped, that is provided on an outer peripheral surface of the first space, and through which the layer corresponding to the adhesive layer 4 is extruded. Accordingly, a tubular body (extruded body) having the ridges corresponding to the ridges 3 on the inner peripheral surface of the layer corresponding to the base layer 2 and the layer corresponding to the adhesive layer 4 on the outer peripheral surface of the layer corresponding to the base layer 2 is obtained.

The method for manufacturing the heat-shrinkable tube enables reliable manufacture of a heat-shrinkable tube having a plurality of ridges with which a plurality of electric wires can be bundled in parallel and arranged in a space-saving manner, the heat-shrinkable tube further including an adhesive layer so that the tube can be easily fixed to an installation surface with the electric wires disposed therein after the tube is heat-shrunk.

Third Embodiment

<Heat-Shrinkable Tube>

Figure 8:
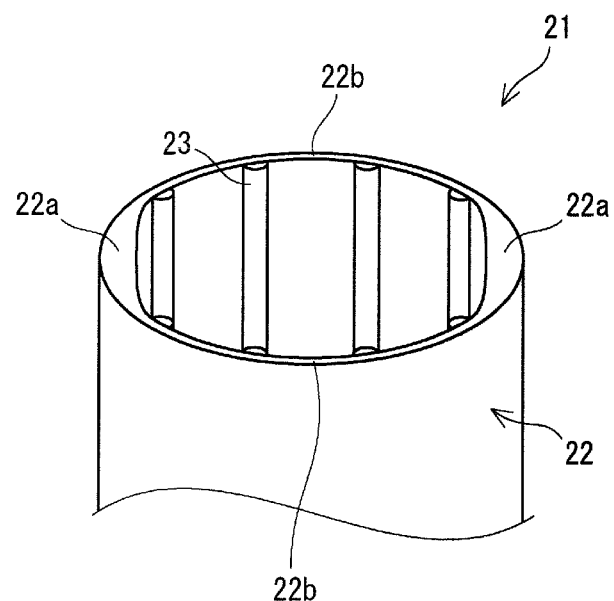
FIG. 8 is a schematic perspective view of a heat-shrinkable tube according to another embodiment that differs from the heat-shrinkable tubes illustrated in FIGS. 1 and 6.
Figure 9:
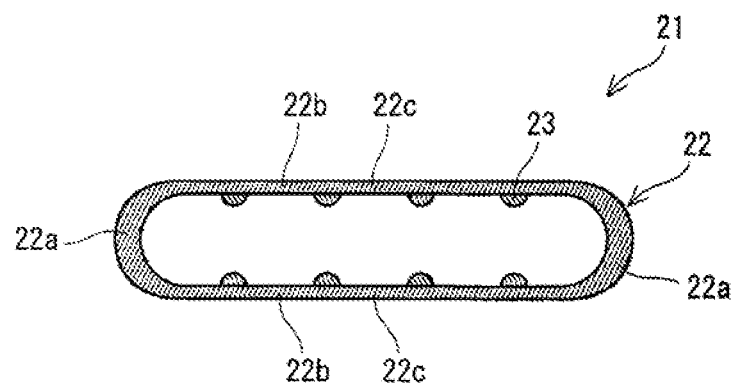
FIG. 9 is a schematic sectional view of the heat-shrinkable tube illustrated in FIG. 8 in a heat-shrunk state.

A heat-shrinkable tube 21 illustrated in FIG. 8 includes a tubular base layer 22 that covers outer peripheries of a plurality of electric wires and a plurality of ridges 23 that are formed on an inner peripheral surface of the base layer 22 and that extend in an axial direction of the base layer 22. The base layer 22 of the heat-shrinkable tube 21 includes a pair of thick portions 22a that extend in the axial direction. More specifically, the base layer 22 includes the pair of thick portions 22a and a pair of thin portions 22b formed between the pair of thick portions 22a and having a thickness less than that of the pair of thick portions 22a. The base layer 22 has a flat tubular shape after being heat-shrunk. Referring to FIG. 9, in the present embodiment, similar to the heat-shrinkable tube 1 illustrated in FIG. 1, the base layer 22 shrinks into an oval tubular shape having a pair of flat plate portions 22c that face each other. The pair of thick portions 22a are positioned to face each other.

The base layer 22 of the heat-shrinkable tube 21 includes the pair of thick portions 22a and the pair of thin portions 22b, and the pair of thin portions 22b shrink earlier than the pair of thick portions when the base layer 22 is heat-shrunk. Since the heat-shrinkable tube 21 is formed such that the pair of thick portions 22a face each other, when the heat-shrinkable tube shrinks, a plurality of electric wires 6 are guided by the pair of thick portions 22a and are easily arranged in parallel on the inner side of the base layer 22. Therefore, the electric wires 6 can be more easily bundled in parallel.

(Base Layer)

The base layer 22 is composed of a resin composition whose main component is a synthetic resin. The base layer 22 is, for example, cylindrical and flexible. Inner peripheral surfaces of portions of the base layer 22 where the ridges 23 are not formed constitute an inner peripheral surface of the heat-shrinkable tube 21. The base layer 22 may be transparent to ensure good visibility of the electric wires from the outside. The synthetic resin may be similar to the synthetic resin contained in the base layer 2 of the heat-shrinkable tube 1 illustrated in FIG. 1 as a main component. Similar to the heat-shrinkable tube 1 illustrated in FIG. 1, the base layer 22 may contain other components, such as a flame retardant, an antioxidant, a copper inhibitor, a lubricant, a colorant, a heat stabilizer, and an ultraviolet absorber, as long as the advantages of the present disclosure are not impaired.

As described above, the base layer 22 includes the pair of thick portions 22a and the pair of thin portions 22b, and the pair of thin portions 22b connect the pair of thick portions 22a to each other. The pair of thick portions 22a and the pair of thin portions 22b each extend between the ends of the base layer 22 in the axial direction. In the present embodiment, the pair of thin portions 22b constitute the pair of flat plate portions 22c, and the pair of thick portions 22a connect the pair of flat plate portions 22c to each other.

The pair of thin portions 22b have a uniform thickness. An average thickness of the pair of thin portions 22b may be similar to the average thickness T of the base layer 2 of the heat-shrinkable tube 1 illustrated in FIG. 2.

Each of the pair of thick portions 22a is, for example, hill-shaped in cross section and bulges from the edges thereof connected to the pair of thin portions 22b toward the center. In the present embodiment, the pair of thick portions 22a are positioned such that the vertices thereof are at the midpoint between the pair of flat plate portions 22c when the base layer 22 is heat-shrunk. However, the positions of the pair of thick portions 22a are not particularly limited. In the case where the pair of thick portions 22a are hill-shaped in cross section as described above, when the base layer 22 is heat-shrunk, the pair of thick portions 22a shrink from the edges adjacent to the pair of thin portions 22b. Therefore, the electric wires can be easily aligned in the flat direction of the base layer 22.

A lower limit of a ratio of an average thickness of the pair of thick portions 22a at the vertices thereof to an average thickness of the pair of thin portions 22b is preferably 1.5, more preferably 2.0, and still more preferably 2.5. An upper limit of the ratio is preferably 5.0, and more preferably 4.0. When the ratio is below the lower limit, the thickness ratio between the pair of thick portions 22a and the pair of thin portions 22b may not be enough to easily and reliably align the electric wires in the flat direction of the base layer 22. When the ratio is above the upper limit, there is a risk that the pair of thick portions 22a cannot appropriately shrink along with the pair of thin portions 22b.

(Ridges)

The ridges 23 are arranged in parallel to the axial direction of the base layer 22. The ridges 23 extend between the ends of the base layer 22 in the axial direction. The ridges 23 are made of the same resin composition as that of the base layer 22, and are formed integrally with the base layer 22. The size of the ridges 23 stays substantially the same after the heat-shrinkable tube 21 is heat-shrunk.

The ridges 23 are formed between the pair of thick portions 22a. Accordingly, the heat-shrinkable tube 21 is capable of easily and reliably aligning the electric wires in the flat direction while guiding the electric wires with the ridges 23.

The heat-shrinkable tube 21 is preferably formed such that a plurality of pairs of ridges 23 are positioned symmetrically about an imaginary plane including a central axis of the base layer 22. In addition, as illustrated in FIG. 9, the heat-shrinkable tube 21 is preferably formed such that the ridges 23 of each pair face each other in a direction perpendicular to the flat direction when the base layer 22 is shrunk into the radially flat tubular shape. More specifically, in the present embodiment, the ridges 23 of each pair are preferably formed at positions on the pair of flat plate portions 22c that face each other.

A pitch of the ridges 23 on the same side of the imaginary plane is preferably uniform. An average pitch of the ridges 23 may be similar to the average pitch of the ridges 3 of the heat-shrinkable tube 1 illustrated in FIG. 1. The shape of the ridges 23 in cross section in a direction perpendicular to the axial direction may be similar to that of the ridges 3 of the heat-shrinkable tube illustrated in FIG. 1. The ridges 23 preferably have a uniform height. An average height of the ridges 23 may be similar to the average height H of the ridges 3 of the heat-shrinkable tube 1 illustrated in FIG. 1. The number of ridges 23 may be similar to the number of ridges 3 of the heat-shrinkable tube 1 illustrated in FIG. 1.

<Connector>

Figure 10:
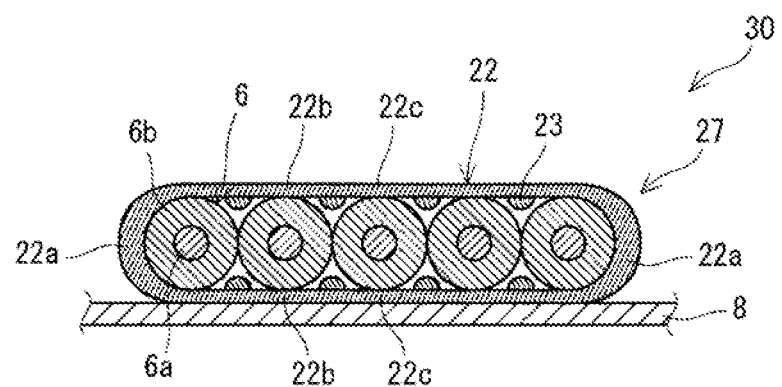
FIG. 10 is a schematic sectional view of a connector formed by using the heat-shrinkable tube illustrated in FIG. 8.

A connector 30 formed by using the heat-shrinkable tube 21 will now be described with reference to FIG. 10. The connector 30 includes a plurality of electric wires 6, each including a conductor 6a and an insulating layer 6b provided on an outer peripheral surface of the conductor 6a, and a tube 27 that covers the electric wires 6. The tube 27 is formed by heat-shrinking the heat-shrinkable tube 21. The tube 27 includes the tubular base layer 22 that covers outer peripheries of the electric wires 6 and the ridges 23 that are formed on the inner peripheral surface of the base layer 22 and that extend in the axial direction of the base layer 22. The electric wires 6 are arranged in one line inside the tube 27. The electric wires 6 are similar to the electric wires 6 of the connector 10 illustrated in FIG. 4, and are thus denoted by the same reference numeral and are not described anew.

The connector 30 is configured such that the base layer 22 includes the pair of thick portions 22a and the pair of thin portions 22b and that the pair of thick portions 22a are positioned to face each other. Therefore, according to the connector 30, the electric wires can be easily arranged in parallel on the inner side of the base layer due to the guiding function provided by the pair of thick portions 22a. Accordingly, the electric wires can be more easily bundled in parallel.

According to the connector 30, for example, the electric wires 6 bundled in parallel by the tube 27 can be easily arranged on a flat plate-shaped attachment substrate 8.

<Method for Manufacturing Heat-Shrinkable Tube>

Figure 5:
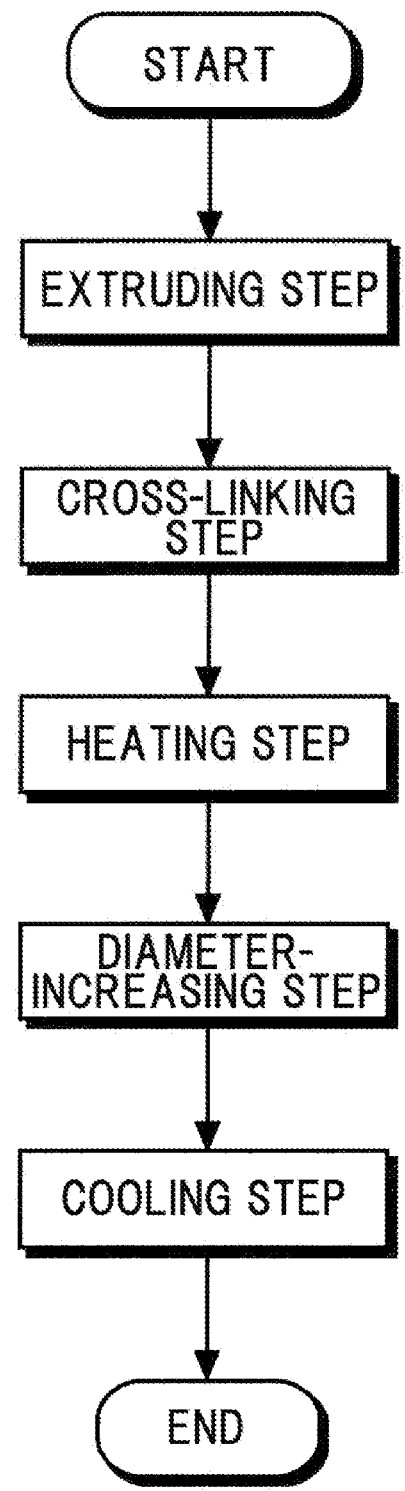
FIG. 5 is a flowchart of a method for manufacturing the heat-shrinkable tube illustrated in FIG. 1.

Similar to the method for manufacturing the heat-shrinkable tube illustrated in FIG. 5, a method for manufacturing the above-described heat-shrinkable tube includes an extruding step of extruding a resin composition in a tubular shape; a cross-linking step of subjecting a tubular body extruded in the extruding step to cross-linking: a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. The method for manufacturing the heat-shrinkable tube is similar to the method for manufacturing the heat-shrinkable tube illustrated in FIG. 5 except that the tubular body extruded in the extruding step includes a pair of thick portions corresponding to the pair of thick portions 22a and a pair of thin portions corresponding to the pair of thin portions 22b.

According to the method for manufacturing the heat-shrinkable tube, a first space that is tubular and from which a layer corresponding to the base layer 22 is extruded is formed in a shape corresponding to the pair of thick portions 22a and the pair of thin portions 22b, so that a tubular body having a shape corresponding to the pair of thick portions 22a and the pair of thin portions 22b can be extruded.

The method for manufacturing the heat-shrinkable tube enables reliable manufacture of a heat-shrinkable tube having a plurality of ridges with which a plurality of electric wires can be bundled in parallel and arranged in a space-saving manner, the heat-shrinkable tube further including a pair of thick portions so that the electric wires can be more easily bundled in parallel.

Fourth Embodiment

<Heat-Shrinkable Tube>

Figure 11:
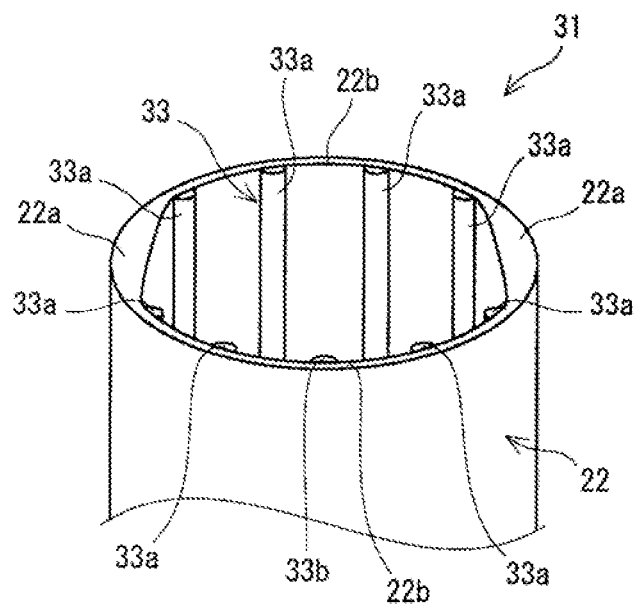
FIG. 11 is a schematic perspective view of a heat-shrinkable tube according to another embodiment that differs from the heat-shrinkable tubes illustrated in FIGS. 1, 6, and 8.

A heat-shrinkable tube 31 illustrated in FIG. 11 includes a tubular base layer 22 that covers outer peripheries of a plurality of electric wires and a plurality of ridges 33 that are formed on an inner peripheral surface of the base layer 22 and that extend in an axial direction of the base layer 22. The ridges 33 include a plurality of first ridges 33a that guide the electric wires and a second ridge 33b used to attach the heat-shrinkable tube 31 to an attachment substrate (not illustrated). The structure of the heat-shrinkable tube 31 may be similar to that of the heat-shrinkable tube 21 illustrated in FIG. 8 except that the ridges 33 include the first ridges 33a and the second ridge 33b. Thus, the base layer 22 is denoted by the same reference numeral as the base layer 22 of the heat-shrinkable tube 21 illustrated in FIG. 8, and description thereof is omitted.

Since the heat-shrinkable tube 31 is configured such that the ridges 33 include the first ridges 33a that guide the electric wires and the second ridge 33b used to attach the heat-shrinkable tube 31 to the attachment substrate, the electric wires can be aligned in parallel by the first ridges 33a and be easily fixed to the attachment substrate in the aligned state by the second ridge 33b.

(Ridges)

The heat-shrinkable tube 31 includes the plurality of first ridges 33a and one second ridge 33b. The first ridges 33a and the second ridge 33b are arranged in parallel to the axial direction of the base layer 22. The first ridges 33a and the second ridge 33b extend between the ends of the base layer 22 in the axial direction. The first ridges 33a and the second ridge 33b are made of the same resin composition as that of the base layer 22, and are formed integrally with the base layer 22. The sizes of the first ridges 33a and the second ridge 33b stay substantially the same after the heat-shrinkable tube 21 is heat-shrunk.

The arrangement, shape, average height, and number of the first ridges 33a may be similar to those of the ridges 23 illustrated in FIG. 8. The first ridges 33a may be arranged at a pitch similar to that of the ridges 23 illustrated in FIG. 8. The pitch between the pair of first ridges 33a that are adjacent to each other with the second ridge 33b disposed therebetween may be greater than the pitch of the other first ridges 33a.

The second ridge 33b is preferably formed on a central portion of the base layer 22 in the flat direction when the base layer 22 is heat-shrunk. The shape of the second ridge 33b in cross section in a direction perpendicular to the axial direction is not particularly limited, and may be, for example, a semicircular shape or a polygonal shape. The size (for example, average height) of the second ridge 33b may be similar to that of the first ridges 33a, or be greater than that of the first ridges 33a to enhance the ability to engage with the attachment substrate.

The heat-shrinkable tube 31 may have a mark on an outer peripheral surface of a portion the base layer 22 that overlaps the second ridge 33b, so that the position of the second ridge 33b can be recognized from the outside.

<Connector>

Figure 12:
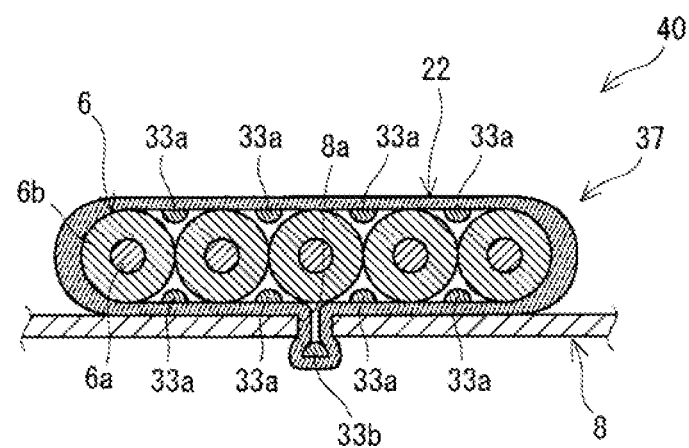
FIG. 12 is a schematic sectional view of a connector formed by using the heat-shrinkable tube illustrated in FIG. 11.

A connector 40 formed by using the heat-shrinkable tube 31 will now be described with reference to FIG. 12. The connector 40 includes a plurality of electric wires 6, each including a conductor 6a and an insulating layer 6b provided on an outer peripheral surface of the conductor 6a, a tube 37 that covers the electric wires 6, and an attachment substrate 8 connected to an outer peripheral surface of the tube 37. The tube 37 is formed by heat-shrinking the heat-shrinkable tube 31. The tube 37 includes the tubular base layer 22 that covers outer peripheries of the electric wires 6, and the ridges 33 that are formed on the inner peripheral surface of the base layer 22 and that extend in the axial direction of the base layer 22. The ridges 33 include the first ridges 33a that guide the electric wires 6 and the second ridge 33b used to attach the tube 37 to the attachment substrate 8. The attachment substrate 8 has a linear slit 8a. The second ridge 33b is engaged with the slit 8a. The electric wires 6 are arranged in one line inside the tube 37. The electric wires 6 are similar to the electric wires 6 of the connector 10 illustrated in FIG. 4, and are thus denoted by the same reference numeral and are not described anew.

The connector 40 is configured such that the second ridge 33b is inserted through the slit 8a and engaged with the attachment substrate 8 at a side opposite to the side at which the electric wires 6 are arranged. The connector 40 is obtained by shrinking the base layer 22 while the second ridge 33b is in the engaged state and while the electric wires 6 are arranged on the inner side of the base layer 22.

According to the connector 40, since the second ridge 33b is engaged with the slit 8a, the electric wires 6 can be arranged in parallel on the attachment substrate 8 that defines an installation surface.

<Method for Manufacturing Heat-Shrinkable Tube>

Similar to the method for manufacturing the heat-shrinkable tube 21 illustrated in FIG. 8, a method for manufacturing the above-described heat-shrinkable tube includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; and a cooling step of cooling the tubular body after the diameter of the tubular body is increased in the diameter-increasing step. The method for manufacturing the heat-shrinkable tube is similar to the method for manufacturing the heat-shrinkable tube 21 illustrated in FIG. 8 except that, in the extruding step, a plurality of ridges corresponding to the first ridges 33a and the second ridge 33b are formed on an inner peripheral surface of a layer corresponding to the base layer 22. In the method for manufacturing the heat-shrinkable tube, rod-shaped second spaces are formed to correspond to the first ridges 33a and the second ridge 33b so that a tubular body having a structure corresponding to the first ridges 33a and the second ridge 33b can be extruded.

The method for manufacturing the heat-shrinkable tube enables reliable manufacture of a heat-shrinkable tube having a plurality of ridges with which a plurality of electric wires can be bundled in parallel and arranged in a space-saving manner, the heat-shrinkable tube also having a ridge engageable with a slit formed in an attachment substrate so that the heat-shrinkable tube can be easily fixed to the attachment substrate.

Fifth Embodiment

<Heat-Shrinkable Sheet>

Figure 13:
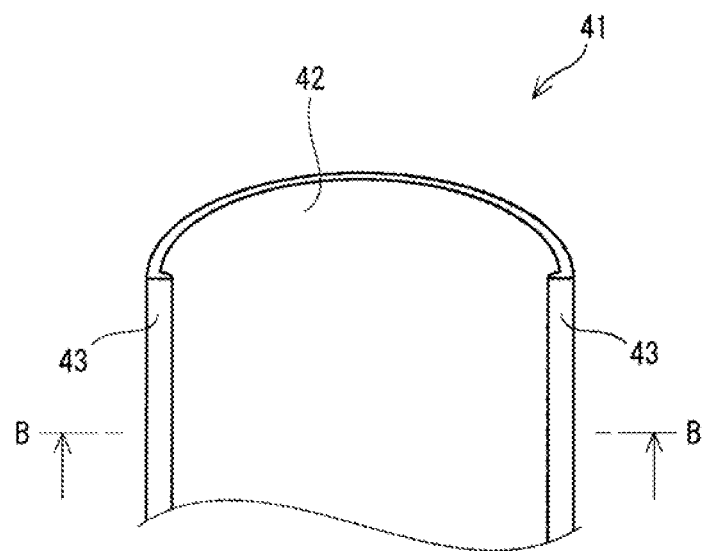
FIG. 13 is a schematic perspective view of a heat-shrinkable sheet according to an embodiment.
Figure 14:
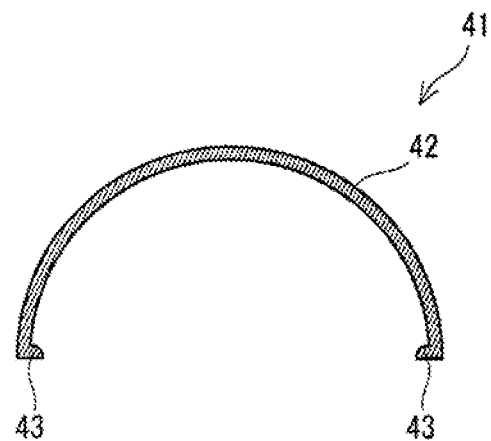
FIG. 14 is a sectional view of the heat-shrinkable sheet illustrated in FIG. 13 taken along line B-B.

A heat-shrinkable sheet 41 illustrated in FIGS. 13 and 14 includes a rectangular base layer 42 that covers outer peripheries of a plurality of electric wires and a pair of ridges 43 that extend along both edges of the base layer 42. In other words, the heat-shrinkable sheet 41 includes the base layer 42 having a rectangular shape (more specifically a rectangular shape when developed onto a plane) obtained by dividing the above-described tubular base layer and the pair of ridges 43 that extend along both edges of the base layer 42 that face each other.

According to the heat-shrinkable sheet 41, the electric wires can be bundled in parallel and arranged in a space-saving manner after the heat-shrinkable sheet 41 is heat-shrunk. In addition, the electric wires can be easily fixed to an installation surface of, for example, a transportation device, such as a vehicle, or an electrical appliance due to the pair of ridges 43 that extend along both edges of the base layer 42.

(Base Layer)

The base layer 42 is, for example, one of pieces into which the base layer 2 of the heat-shrinkable tube 1 illustrated in FIG. 1 is divided along the axial direction. Therefore, the main component and average thickness of the base layer 42 may be similar to those of the base layer 2 of the heat-shrinkable tube illustrated in FIG. 1.

In the present embodiment, the base layer 42 is one of pieces into which a tubular base layer is divided along a plane including a central axis of the base layer. Therefore, the cross-sectional shape of the base layer 42 is a partial annular shape obtained by dividing an annular shape into halves. The base layer 42 may be formed to shrink into a flat shape with a large shrinkage ratio in a direction perpendicular to the dividing line when heated.

(Ridges)

The pair of ridges 43 are used to attach the heat-shrinkable sheet 41 to an attachment substrate (not illustrated). The pair of ridges 43 are preferably provided at both edges of the base layer 42 in a bending direction. In other words, the pair of ridges 43 are preferably provided at positions facing each other across a central axis of the cylindrical base layer before the tubular base layer is divided. The shape of the pair of ridges 43 in cross section in a direction perpendicular to the axial direction is not particularly limited, and may be, for example, a sector shape or a polygonal shape. The size (for example, average height) of the pair of ridges 43 may be similar to that of the second ridge 33b of the heat-shrinkable tube 31 illustrated in FIG. 11.

<Connector>

Figure 15:
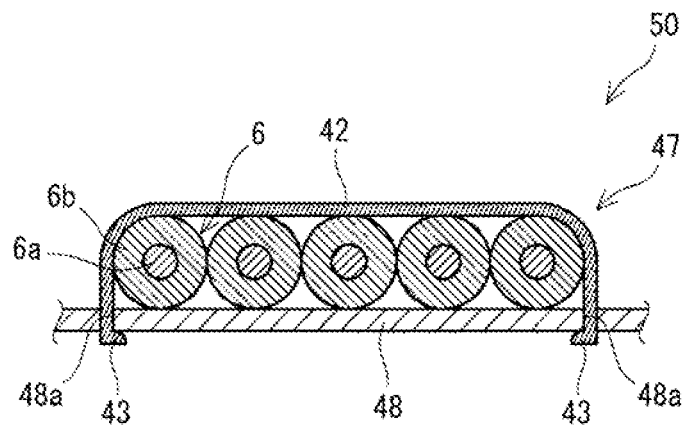
FIG. 15 is a schematic sectional view of a connector formed by using the heat-shrinkable sheet illustrated in FIG. 13.

A connector 50 formed by using the heat-shrinkable sheet 41 will now be described with reference to FIG. 15. The connector 50 includes a plurality of electric wires 6, each including a conductor 6a and an insulating layer 6b provided on an outer peripheral surface of the conductor 6a, a sheet 47 that covers the electric wires 6, and an attachment substrate 48 having a pair of slits 48a that are linear and parallel to each other. The attachment substrate 48 is connected to the sheet 47 with the electric wires 6 disposed between the attachment substrate 48 and the sheet 47. The sheet 47 is formed by heat-shrinking the heat-shrinkable sheet 41. The sheet 47 includes the base layer 42 having a rectangular shape (rectangular shape when developed onto a plane) that covers outer peripheries of the electric wires 6 and the pair of ridges 43 that extend along both edges of the base layer 42. The pair of ridges 43 are engaged with the pair of slits 48a. The attachment substrate 48 is flat plate-shaped. The electric wires 6 are arranged in one line between the sheet 47 and the attachment substrate 48. The electric wires 6 are similar to the electric wires 6 of the connector 10 illustrated in FIG. 4, and are thus denoted by the same reference numeral and are not described anew.

The connector 50 is configured such that the pair of ridges 43 are inserted through the pair of slits 48a and engaged with the attachment substrate 48 at a side opposite to the side at which the electric wires 6 are arranged. The connector 50 is obtained by shrinking the base layer 42 while the pair of ridges 43 are in the engaged state and while the electric wires 6 are inserted between the base layer 42 and the attachment substrate 48.

According to the connector 50, the sheet 47 is connected to the attachment substrate 48 by the pair of ridges 43, which extend along both edges of the base layer 42, while the electric wires 6 are disposed between the sheet 47 and the attachment substrate 48. Thus, the electric wires 6 can be bundled in parallel.

<Method for Manufacturing Heat-Shrinkable Sheet>

Figure 16:
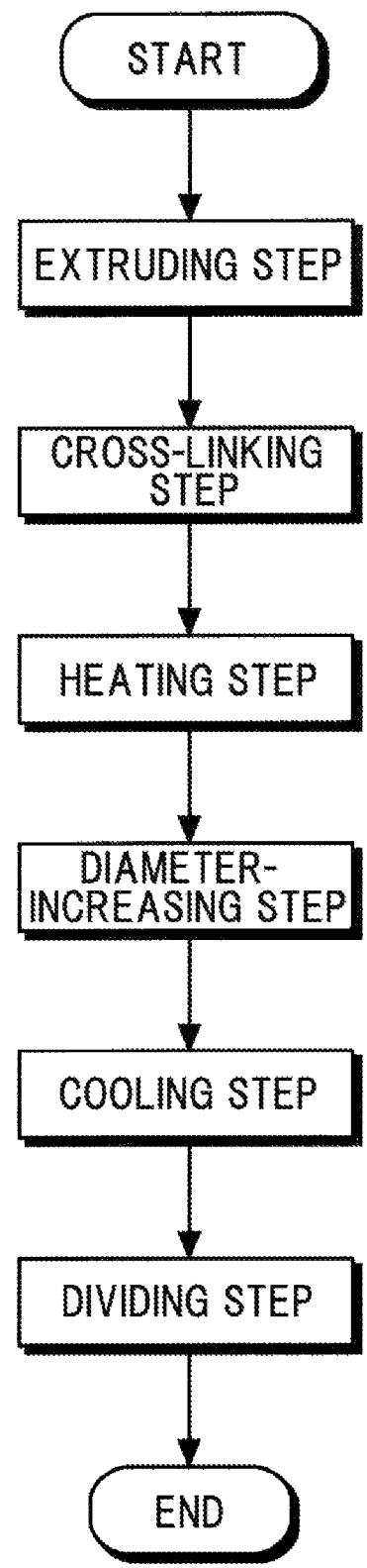
FIG. 16 is a flowchart of a method for manufacturing the heat-shrinkable sheet illustrated in FIG. 13.

A method for manufacturing the heat-shrinkable sheet 41 will now be described with reference to FIG. 16. The method for manufacturing the heat-shrinkable sheet includes an extruding step of extruding a resin composition in a tubular shape; a cross-linking step of subjecting a tubular body extruded in the extruding step to cross-linking; a heating step of heating the tubular body subjected to cross-linking in the cross-linking step to a temperature higher than or equal to a melting point or a softening point; a diameter-increasing step of increasing a diameter of the tubular body after the tubular body is heated in the heating step; a cooling step of cooling the tubular body after the diameter of the tubular body is increased in the diameter-increasing step; and a dividing step of dividing the tubular body in an axial direction (so that sections are parallel to the axial direction) after the tubular body is cooled in the cooling step. The extruding step may be similar to the extruding step illustrated in FIG. 5 except that a pair of ridges corresponding to the pair of ridges 43 are formed on an inner peripheral surface of a layer corresponding to the base layer 42 before the dividing step. According to the method for manufacturing the heat-shrinkable sheet, rod-shaped second spaces are formed to correspond to the pair of ridges 43 so that a pair of ridges that extend in the axial direction can be formed on the inner peripheral surface of the layer corresponding to the base layer 42 before the dividing step. The heating step, the diameter-increasing step, and the cooling step may be similar to those of the method for manufacturing the heat-shrinkable tube illustrated in FIG. 5.

(Dividing Step)

Figure 17:
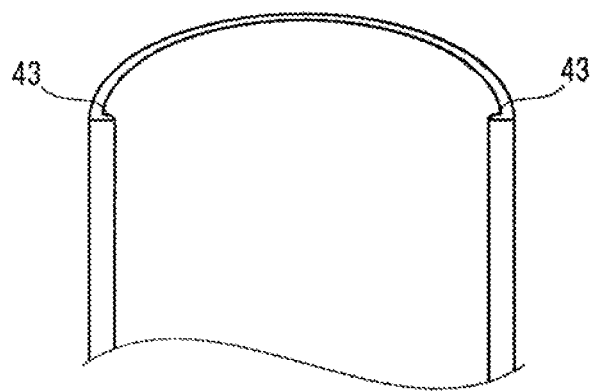
FIG. 17 is a schematic perspective view illustrating the manner in which a tubular body is divided in a dividing step of the method for manufacturing the heat-shrinkable sheet illustrated in FIG. 16.

The dividing step can be carried out by placing a blade for dividing the tubular body on a conveyance path along which the tubular body is conveyed after the cooling step. As illustrated in FIG. 17, in the dividing step, the tubular body is preferably divided into halves so that the pair of ridges 43 are positioned at both ends.

The method for manufacturing the heat-shrinkable sheet may further include a winding step of winding the tubular body that has been cooled in the cooling step before the dividing step. The method for manufacturing the heat-shrinkable sheet may further include a cutting step of cutting the sheet obtained by the dividing step to a desired length.

The method for manufacturing the heat-shrinkable sheet enables reliable manufacture of a heat-shrinkable sheet with which a plurality of electric wires can be bundled in parallel and arranged in a space-saving manner, the heat-shrinkable sheet including a pair of ridges on both sections that extend along both edges of the base layer, so that the electric wires can be easily fixed to an installation surface of a transportation device, such as a vehicle, or an electrical appliance.

Other Embodiments

It is to be understood that the embodiments disclosed herein are examples and not restrictive in all respects. The scope of the present invention is not limited by the configurations of the above-described embodiments but is defined by the claims, and is intended to include equivalents to the scope of the claims and all modifications within the scope of the claims.

Figure 18:
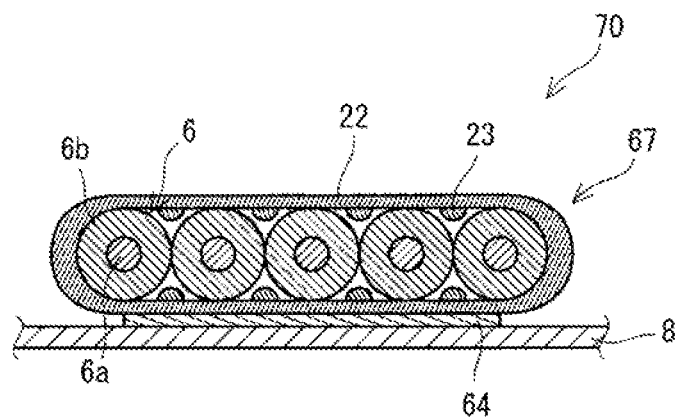
FIG. 18 is a schematic sectional view of a connector formed by using a heat-shrinkable tube according to another embodiment that differs from the heat-shrinkable tubes illustrated in FIGS. 1, 6, 8, and 11.

The configurations of the first to fifth embodiments described above may be applied in combination as appropriate. For example, a heat-shrinkable tube having the configuration illustrated in FIG. 8, in which a base layer includes a pair of thick portions, may additionally include an adhesive layer provided on an outer peripheral surface of the base layer. In such a case, the adhesive layer is preferably provided on a flat surface of the base layer when the base layer is heat-shrunk. FIG. 18 illustrates a connector 70 formed by using a heat-shrinkable tube including a tubular base layer 22 that covers outer peripheries of a plurality of electric wires 6, a plurality of ridges 23 that are formed on an inner peripheral surface of the base layer 22 and that extend in an axial direction of the base layer 22, and an adhesive layer 64 provided on an outer peripheral surface of the base layer 22. The connector 70 includes the electric wires 6, each including a conductor 6a and an insulating layer 6b provided on an outer peripheral surface of the conductor 6a, a tube 67 that covers the electric wires 6, and an attachment substrate 8 connected to an outer peripheral surface of the tube 67. The tube 67 is formed by heat-shrinking the heat-shrinkable tube in which the adhesive layer 64 is provided on the outer peripheral surface of the base layer 22 illustrated in FIG. 8. The tube 67 is bonded to the attachment substrate 8 by the adhesive layer 64. According to the connector 70, the electric wires 6 can be bundled in parallel on the attachment substrate 8.

In the above-described embodiments, the adhesive layer is disposed between the outer peripheral surface of the base layer and the attachment substrate, and the heat-shrinkable tube is attached to the attachment substrate by the adhesive layer. However, the configuration is not limited to this. For example, a plurality of connecting bodies may be stacked with an adhesive layer provided therebetween.

In the above-described embodiments, the ridges are formed between the pair of thick portions. However, the ridges may be formed at any positions on the inner peripheral surface of the base layer. For example, the ridges may be formed on the pair of thick portions. The guiding function of the ridges can be improved by forming the ridges on the pair of thick portions.

The heat-shrinkable tube may include a layer other than the base layer, the ridges, and the adhesive layer as long as the advantages of the present disclosure are not impaired. For example, the heat-shrinkable tube may include an additional resin layer between the base layer and the adhesive layer. Also, the heat-shrinkable sheet may include a layer other than the base layer and the ridges as long as the advantages of the present disclosure are not impaired. For example, the heat-shrinkable sheet may include an adhesive layer or any other resin layer on an outer peripheral surface of the base layer.

The heat-shrinkable tube is not necessarily formed such that the base layer thereof shrinks into a radially flat tubular shape when heated. The heat-shrinkable tube may instead be formed such that, for example, the base layer thereof shrinks into a rectangular tubular shape having rectangular openings or other shapes when heated.

The heat-shrinkable tube may include two or more second ridges for attaching the heat-shrinkable tube to the attachment substrate on the inner peripheral surface of the base layer.

The heat-shrinkable tube preferably further includes an adhesive layer provided on the inner peripheral surface of the base layer. When the heat-shrinkable tube further includes the adhesive layer provided on the inner peripheral surface of the base layer, the electric wires can be easily fixed to the inner peripheral surface of the base layer.

The pair of ridges provided on the base layer of the heat-shrinkable sheet are not necessarily arranged to extend along both edges of the base layer, and may be spaced from both edges.

The method for manufacturing the heat-shrinkable tube may include a step of forming the adhesive layer as a step different from the above-described extruding step. When the step of forming the adhesive layer is additionally provided, the adhesive layer does not necessarily have a band shape that extends between the ends of the base layer in the axial direction.

REFERENCE SIGNS LIST 1, 11, 21, 31 heat-shrinkable tube
2, 22, 42 base layer
2a, 22c flat plate portion
3, 23, 33, 43 ridge
4, 64 adhesive layer
6 electric wire
6a conductor
6b insulating layer
7, 17, 27, 37, 67 tube
8, 48 attachment substrate
8a, 48a slit
10, 20, 30, 40, 50, 70 connector
22a thick portion
22b thin portion
33a first ridge
33b second ridge
41 heat-shrinkable sheet
47 sheet

The invention claimed is:

1. A heat-shrinkable sheet comprising:
a base layer that has a halved annular shape and that covers outer peripheries of a plurality of electric wires; and
a pair of ridges that extend along both edges of the base layer at positions facing each other across a central axis of the base layer and that protrude from the base layer radially inward toward each other;
wherein the ridges project from an inner surface of the base layer.

2. A connecting body comprising:
a plurality of electric wires, each electric wire including a conductor and an insulating layer provided on an outer peripheral surface of the conductor; and
a tube that covers the plurality of electric wires,
wherein the tube includes
a base layer that is tubular and that covers outer peripheries of the plurality of electric wires, and
a plurality of ridges that are formed on an inner peripheral surface of the base layer and that extend in an axial direction of the base layer
an attachment substrate connected to an outer peripheral surface of the tube,
wherein the attachment substrate has a slit that is linear, and
wherein the plurality of ridges include a ridge that is engaged with the slit.

3. A connecting body comprising:
a plurality of electric wires, each electric wire including a conductor and an insulating layer provided on an outer peripheral surface of the conductor;
a sheet that covers the plurality of electric wires; and
an attachment substrate having a pair of slits that are linear and parallel to each other, the attachment substrate being connected to the sheet with the plurality of electric wires disposed between the attachment substrate and the sheet,
wherein the sheet includes
a base layer that is rectangular and that covers outer peripheries of the plurality of electric wires, and
a pair of ridges that extend along both edges of the base layer, and
wherein the pair of ridges are engaged with the pair of slits.

4. A method for manufacturing a heat-shrinkable tube, the method comprising:
an extruding step of extruding a resin composition in a tubular shape;
a cross-linking step of subjecting a tubular body extruded in the extruding step to cross-linking;
a heating step of heating the tubular body subjected to cross-linking in the cross-linking step to a temperature higher than or equal to a melting point or a softening point;
a diameter-increasing step of increasing a diameter of the tubular body after the tubular body is heated in the heating step; and
a cooling step of cooling the tubular body after the diameter of the tubular body is increased in the diameter-increasing step,
wherein, in the extruding step, a plurality of ridges that extend in an axial direction are formed on an inner peripheral surface of the tubular body.

* * * * *